United States Patent Office 3,636,126
Patented Jan. 18, 1972

3,636,126
METATHESIS OF OLEFINS
Henry R. Menapace, Stow, and Jin-Liang Wang, Akron, Ohio, assignors to The Goodyear Tire & Rubber Company, Akron, Ohio
No Drawing. Filed Sept. 8, 1969, Ser. No. 856,165
Int. Cl. C07c 3/62
U.S. Cl. 260—683 D
2 Claims

ABSTRACT OF THE DISCLOSURE

There is disclosed a process for the formation of new olefins from internal olefins by subjecting an internal olefin to a catalyst of a mixture of alkyllithium and tungsten or molybdenum halides.

---

The present invention relates to a novel method for the synthesis of chemical compounds containing at least one internal olefinic carbon-to-carbon double bond.

By the term "internal double bond" is meant that the double bond is not attached to terminal carbon atoms but is attached to carbon atoms at least one carbon atom from the end of the chain; for instance, 2-butene as opposed to 1-butene.

The invention is also directed to a new catalytic process whereby internal olefins may undergo novel metathesis reactions under extremely mild temperature and pressure conditions resulting in the formation of new and different internal olefins. The term "olefin-metathesis" or "metathesis" when used in this application is intended to designate the novel reaction whereby internal olefins undergo certain skeletal or configurational or both skeletal and configurational transformations by the interchange of similar or dissimilar constituent groups between different double bonds. The nature of this olefin metathesis process may be described by the formulas set forth below:

2A—CH=CH—B → A—CH=CH—A + BCH=CH—B

Thus, for example, two moles of pentene-2 can be converted to butene-2 and hexene-3.

Thus, the invention comprises subjecting an internal olefin to an olefin metathesis catalyst comprising mixtures of alkyllithium compounds and tungsten or molybdenum halides.

Representative of the alkyllithium compounds useful in this invention are: ethyllithium, propyllithium, butyllithium and the like. Representative of the tungsten halides useful in this invention are tungsten hexachloride, tungsten hexabromide, tungsten hexafluoride, tungsten heptabromide, tungsten heptachloride, and tungsten hexafluoride. The molybdenum halides useful in this invention may be molybdenum heptachloride, molybdenum heptabromide, molybdenum hexafluoride and molybdenum hexachloride.

Representative of the internal olefins which may be employed in this invention are 2-pentene, 3-hexene, 2- and 3-heptene, 2- and 3-octene and the like.

A further understanding of this invention may be had with reference to the following examples which are intended to be representative rather than restrictive of the scope of this invention.

EXAMPLE I

In a clean, dry, four-ounce glass bottle equipped with a means for injecting with hypodermic syringes chemicals were added: 5 milliliters of a 0.04 molar tungsten hexachloride in benzene solution ($2 \times 10^{-4}$ moles) followed by 2.25 milliliters of 4.5 molar mixture of cis and trans 2-pentene in n-pentane ($1 \times 10^{-2}$ moles). This was followed by 10 milliliters of 0.4 molar n-butyllithium in benzene ($4 \times 10^{-4}$ moles). The bottle was shaken at room temperature for four hours. The catalyst was deactivated by the injection of one milliliter of isopropyl alcohol. An analysis was made of the contents of the bottle by vapor phase chromatograph analysis. There was obtained a 50 percent conversion and a 100 percent total selectivity to 2-butene and 3-hexene.

EXAMPLE II

In an experiment identical to that of Example I except that cis 2-pentene was employed instead of the mixed 2-pentene. There was obtained a 50 percent conversion and a 100 percent total selectivity to 2-butene and 3-hexene.

EXAMPLE III

In an experiment identical to that of Example I except that trans 2-pentene was employed instead of the mixed 2-pentene. There was obtained a 40 percent conversion and a 100 percent total selectivity to 2-butene and 3-hexene.

Since the olefin metathesis reaction is in equilibrium, a 50 percent conversion of the starting material is all that can be obtained. Even though there is a possibility that 100 percent of the starting material undergoes the metathesis reaction, there is found at least 50 percent of the starting material at the end of the reaction. This is due to the fact that even though all of the double bonds undergo a metathesis, at least 50 percent of the fragments formed will join with a similar fragment to reconstitute the starting material. Likewise, if 2-butene is employed as the starting material, only 2-butene will result.

The conditions under which olefin metathesis reaction takes place may vary very widely. Unlike any prior olefin disproportionation reactions, the temperature and pressure conditions required in this invention are very mild. The reaction will take place at extremely low temperatures and ambient pressures. As can be seen from the above examples, room temperature was employed. Thus, the temperature may range from extremely low temperature, such as $-100°$ C. or lower, upwards to extremely high temperature, such as 200° C. or higher. The pressure is not critical and may vary from atmospheric to superatmospheric to subatmospheric.

While certain representative embodiments and details have been shown for the purpose of illustrating the invention, it will be apparent to those skilled in this art that various changes and modifications may be made therein without departing from the spirit or scope of the invention.

What is claimed is:
1. The olefin metathesis process which comprises subjecting at least one internal olefin to a catalyst system consisting essentially of a mixture of alkyllithium and a halide of tungsten or molybdenum.
2. The olefin metathesis process according to claim 1 in which the catalyst is a mixture of n-butyllithium and tungsten hexachloride.

References Cited
UNITED STATES PATENTS
3,535,401  10/1970  Calderon et al. _____ 260—683

PAUL M. COUGHLAN, JR., Primary Examiner
C. E. SPRESSER, JR., Assistant Examiner